US012202263B2

(12) United States Patent
Matsubara

(10) Patent No.: US 12,202,263 B2
(45) Date of Patent: Jan. 21, 2025

(54) LIQUID EJECTING APPARATUS

(71) Applicant: SEIKO EPSON CORPORATION, Tokyo (JP)

(72) Inventor: Yoshitaka Matsubara, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 120 days.

(21) Appl. No.: 17/898,509

(22) Filed: Aug. 30, 2022

(65) Prior Publication Data

US 2023/0066215 A1 Mar. 2, 2023

(30) Foreign Application Priority Data

Aug. 31, 2021 (JP) ................................ 2021-140968

(51) Int. Cl.
*B41J 2/045* (2006.01)
*B41J 2/14* (2006.01)

(52) U.S. Cl.
CPC ....... *B41J 2/04573* (2013.01); *B41J 2/04581* (2013.01); *B41J 2/04596* (2013.01)

(58) Field of Classification Search
CPC ................................................... B41J 2/04596
See application file for complete search history.

(56) References Cited

U.S. PATENT DOCUMENTS 6,328,395 B1 12/2001 Kitahara et al.
2009/0147034 A1* 6/2009 Yoshida ............... B41J 2/04588 347/10
2013/0063507 A1* 3/2013 Sasaki .................. B41J 2/04593 347/11
2013/0083106 A1* 4/2013 Tsukamoto .......... B41J 2/04596 347/10
2015/0197085 A1* 7/2015 Panchawagh ........ B41J 2/04598 347/10
2023/0141947 A1* 5/2023 De Meutter ........... C09D 11/40 347/14

FOREIGN PATENT DOCUMENTS

JP H10-081013 A 3/1998

* cited by examiner

*Primary Examiner* — Shelby L Fidler

(74) *Attorney, Agent, or Firm* — Harness, Dickey & Pierce, P.L.C.

(57) ABSTRACT

A liquid ejecting apparatus is configured to drive a driving element in accordance with a driving signal applied by control of the controller. A driving signal includes a first ejection pulse for ejecting liquid, a second ejection pulse for ejecting liquid, and a non-ejection pulse for not ejecting liquid. The controller selects the first ejection pulse and the second ejection pulse to supply to the driving element, when a first amount of liquid is to be ejected from the nozzle in the unit period. The controller selects the non-ejection pulse and the second ejection pulse to supply to the driving element, when a second amount of liquid that is smaller than the first amount of liquid is to be ejected from the nozzle in the unit period. The second amount of liquid is larger than an amount of liquid ejected by only the second ejection pulse.

16 Claims, 12 Drawing Sheets

| SAMPLE NO. | WAVEFORM ORDER | | | | EFFECTS | | |
|---|---|---|---|---|---|---|---|
| | 1 | 2 | 3 | 4 | LARGE DOTS | MEDIUM DOTS | SMALL DOTS |
| 1 | PA2 | PA4 | PA1 | PA3 | | | |
| 2 | | | PA3 | PA1 | | | |
| 3 | | PA1 | PA4 | PA3 | P | | |
| 4 | | | PA3 | PA4 | | P | |
| 5 | | PA3 | PA4 | PA1 | P | P | |
| 6 | | | PA1 | PA4 | | | |
| 7 | PA1 | PA2 | PA4 | PA3 | | | P |
| 8 | | | PA3 | PA4 | P | P | P |
| 9 | | PA3 | PA2 | PA4 | | P | P |
| 10 | PA3 | PA4 | PA2 | PA1 | | P | |
| 11 | | | PA1 | PA2 | P | P | |
| 12 | | PA1 | PA2 | PA4 | | | P |

LIQUID EJECTING APPARATUS

The present application is based on, and claims priority from JP Application Serial Number 2021-140968, filed Aug. 31, 2021, the disclosure of which is hereby incorporated by reference herein in its entirety.

BACKGROUND

1. Technical Field

The present disclosure relates to a liquid ejecting apparatus.

2. Related Art

Liquid ejecting apparatuses represented by ink jet printers generally have a liquid ejection head that ejects liquid, such as ink. Such a liquid ejection head includes, as disclosed in JP-A-10-81013, nozzles that eject liquid, a pressure chamber that communicates with the nozzles, and a driving element that applies a pressure change to liquid included in the pressure chamber in response to a driving signal.

In JP-A-10-81013, the driving signal includes a plurality of pulses in a print period and the driving element is driven by selectively using the pulses so that printing is performed in a plurality of tones.

According to JP-A-10-81013, there arises a problem in that, when the print period becomes shorter in accordance with increase in print speed, printing may not be performed in a plurality of tones having appropriate differences of color densities.

SUMMARY

According to an aspect of the present disclosure, a liquid ejecting apparatus includes a nozzle that ejects liquid, a pressure chamber that communicates with the nozzle, a driving element that applies a pressure change on liquid included in the pressure chamber in accordance with a driving signal, a driving signal generation section that generates the driving signal, and a controller that controls supply of the driving signal to the driving element for each unit period of a predetermined cycle. The driving signal includes a first ejection pulse for driving the driving element so that liquid is ejected from the nozzle, a second ejection pulse for driving the driving element so that liquid is ejected from the nozzle, and a non-ejection pulse for driving the driving element without ejecting liquid from the nozzle at different timings in the unit period. The controller selects, when a first amount of liquid is to be ejected from the nozzle in the unit period, the first ejection pulse and the second ejection pulse as pulses to be supplied to the driving element, and selects, when a second amount of liquid that is smaller than the first amount of liquid is to be ejected from the nozzle in the unit period, the non-ejection pulse and the second ejection pulse as pulses to be supplied to the driving element. The second amount of liquid is larger than an amount of liquid ejected from the nozzle obtained when only the second ejection pulse is supplied to the driving element.

DESCRIPTION OF EXEMPLARY EMBODIMENTS

Figure 1:
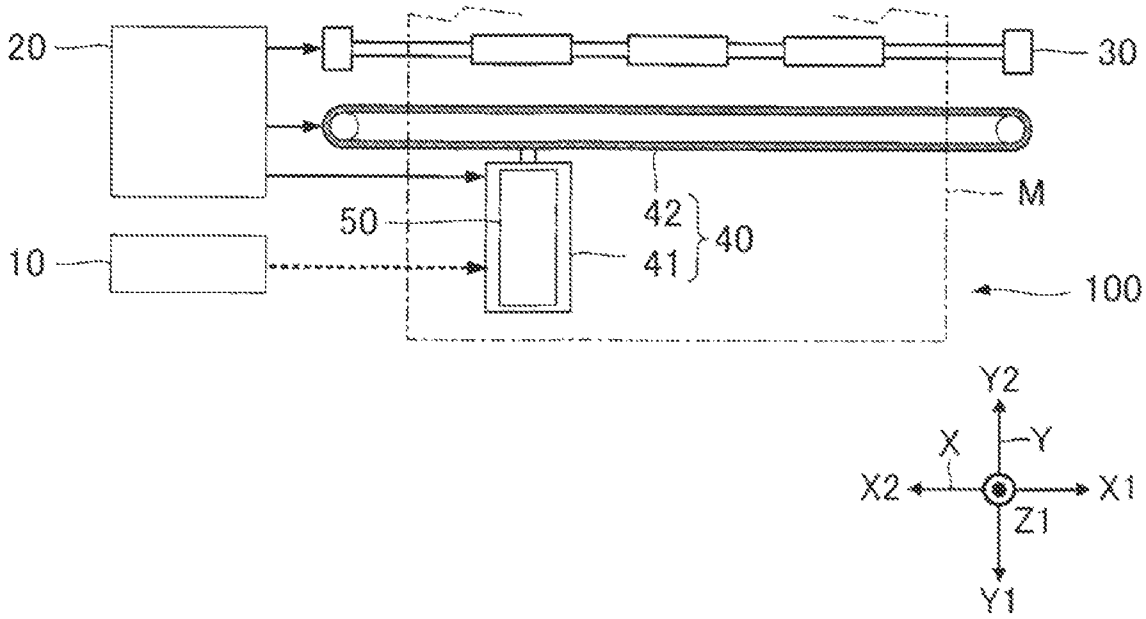
FIG. 1 is a diagram schematically illustrating an example of a configuration of a liquid ejecting apparatus according to a first embodiment.

Hereinafter, preferred embodiments of the present disclosure will be described with reference to the accompanying drawings. Note that sizes and scales of individual sections in the drawings are different from actual ones where appropriate, and some portions are schematically illustrated to facilitate understandings. Furthermore, a range of the present disclosure is not limited to the embodiments unless a description for restricting the present disclosure is included in the description below.

Note that, in the description below, X, Y, and Z axes that intersect with one another are appropriately used. Furthermore, one direction along the X axis is referred to as an X1 direction and a direction opposite to the X1 direction is referred to as an X2 direction. Similarly, directions opposite to each other along the Y axis are referred to as a Y1 direction and a Y2 direction. Directions opposite to each other along the Z axis are referred to as a Z1 direction and a Z2 direction.

Typically, the Z axis vertically extends, and the Z2 direction corresponds to a lower direction in a vertical direction. Note that the Z axis may not vertically extend. Furthermore, although the X, Y, and Z axes typically intersect with one another in an orthogonal manner, the present disclosure is not limited to this, and the X, Y, and Z axes may intersect with one another at an angle within a range from 80 degrees to 100 degrees.

A: First Embodiment

A1: Entire Configuration of Liquid Ejecting Apparatus

FIG. 1 is a diagram schematically illustrating an example of a configuration of a liquid ejecting apparatus 100 according to a first embodiment. The liquid ejecting apparatus 100 is a print apparatus employing an ink jet method that ejects liquid, such as ink, as droplets to a medium M. Examples of the medium M include a print sheet. Note that the medium M is not limited to a print sheet and may be a print target of arbitrary material, such as a resin film or fabric.

The liquid ejecting apparatus 100 includes a liquid container 10, a control unit 20, a transport mechanism 30, a movement mechanism 40, and a liquid ejection head 50 as illustrated in FIG. 1.

The liquid container 10 stores ink. Concrete modes of the liquid container 10 include a cartridge that is detachable from the liquid ejecting apparatus 100, a bag-shaped ink pack formed by a flexible film, and an ink tank for charging ink. Note that a type of the ink stored in the liquid container 10 is arbitrarily determined.

The control unit 20 controls operations of various components in the liquid ejecting apparatus 100. The control unit 20 includes at least one processing circuit, such as a CPU (Central Processing Unit) or an FPGA (Field Programmable Gate Array) and at least one storage circuit, such as a semiconductor memory. A configuration of the control unit 20 will be described in detail hereinafter with reference to FIG. 2.

The transport mechanism 30 transports the medium M in the Y1 direction under control of the control unit 20. The movement mechanism 40 reciprocates the liquid ejection head 50 along the X axis under control of the control unit 20. The movement mechanism 40 includes a carriage 41 of a substantially box shape for accommodating the liquid ejection head 50 and an endless transport belt 42 on which the carriage 41 is fixed. Note that the number of liquid ejection heads 50 mounted on the carriage 41 is not limited to 1 and a plurality of liquid ejection heads 50 may be mounted. Furthermore, the liquid container 10 described above may be mounted on the carriage 41 in addition to the liquid ejection head 50.

The liquid ejection head 50 ejects ink supplied from the liquid container 10 to the medium M through individual nozzles under control of the control unit 20. The ejection is performed simultaneously with transport of the medium M by the transport mechanism 30 and a reciprocation movement of the liquid ejection head 50 driven by the movement mechanism 40, and therefore, an image is formed on a surface of the medium M by the ink.

A2: Electric Configuration of Liquid Ejecting Apparatus

Figure 2:
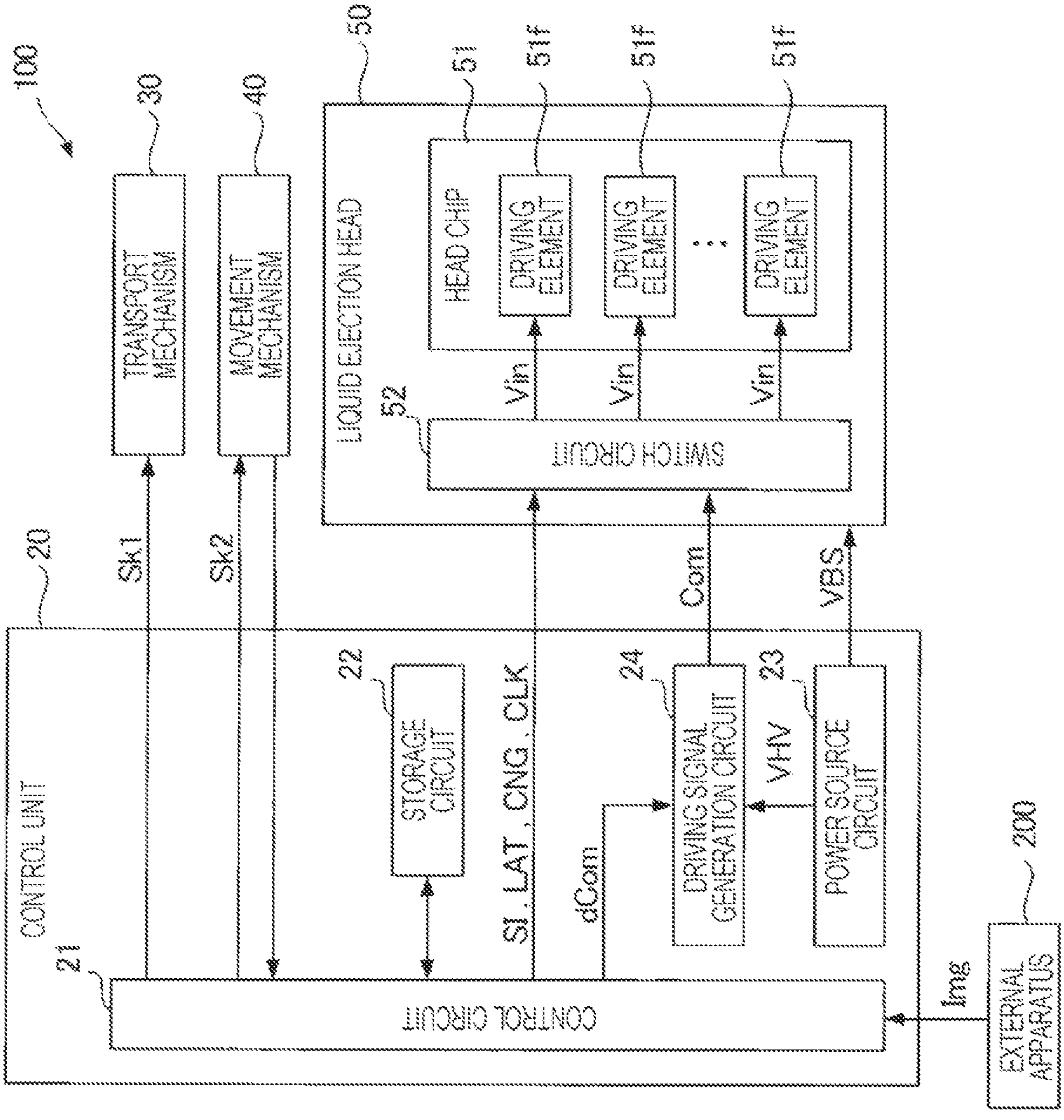
FIG. 2 is a diagram illustrating an electric configuration of the liquid ejecting apparatus according to the first embodiment.

FIG. 2 is a diagram illustrating an electric configuration of the liquid ejecting apparatus 100 according to the first embodiment. Before the control unit 20 is described hereinafter with reference to FIG. 2, the liquid ejection head 50 will be briefly described.

As illustrated in FIG. 2, the liquid ejection head 50 includes a head chip 51 and a switch circuit 52.

The head chip 51 includes a plurality of driving elements 51*f* that are appropriately driven so that ink is ejected from the nozzles. Here, the individual driving elements 51*f* apply pressure to the ink when receiving supply of a supply signal Vin. The head chip 51 will be described in detail hereinafter with reference to FIGS. 3 to 5.

The switch circuit 52 determines whether a driving signal Com supplied from the control unit 20 is to be supplied as the supply signal Vin for each of the driving elements 51*f* included in the head chip 51 under control of the control unit 20. Note that the switch circuit 52 will be described in detail hereinafter with reference to FIG. 4.

Furthermore, although the number of head chips 51 included in the liquid ejection head 50 is 1 in the example of FIG. 2, the present disclosure is not limited to this, and the number of head chips 51 included in the liquid ejection head 50 may be 2 or more. Hereinafter, assuming that the number of nozzles N included in the head chip 51 is denoted by M, the driving elements 51*f* are represented as driving elements 51*f*[m] where appropriate so that the M driving elements 51*f* corresponding to the M nozzles are individually distinguished from one another. Note that M is a natural number equal to or larger than 1, and m is a natural number equal to or larger than 1 and equal to or smaller than M. Furthermore, M other components or M other signals corresponding to the nozzles N or the driving elements 51*f* in the liquid ejecting apparatus 100 are also represented using an index [m] so that the correspondence relationship with the nozzles N or the driving elements 51*f*[m] is represented.

As illustrated in FIG. 2, the control unit 20 includes a control circuit 21, a storage circuit 22, a power source circuit 23, and a driving signal generation circuit 24.

The control circuit 21 has a function of controlling operations of the various sections of the liquid ejecting apparatus 100 and a function of processing various data. The control circuit 21 includes at least one processor, such as a CPU. Note that the control circuit 21 may include, instead of the CPU or in addition to the CPU, a programmable logic device, such as an FPGA. Furthermore, when the control circuit 21 includes a plurality of processors, the different processors may be implemented on different substrates or the like.

The storage circuit 22 stores various programs to be executed by the control circuit 21 and various data, such as print data Img, to be processed by the control circuit 21. The storage circuit 22 includes at least one of two types of semiconductor memory, that is, a volatile memory, such as a RAM (Random Access Memory), and a nonvolatile memory, such as an EEPROM (Electrically Erasable Programmable ROM) or a PROM (Programmable ROM). The print data Img is supplied from an external apparatus 200, such as a personal computer or a digital still camera. Note that the storage circuit 22 may be configured as a portion of the control circuit 21.

The power supply circuit 23 receives supply of electric power from a commercially used power source, not illustrated, so as to generate various given potentials. The generated various potentials are appropriately supplied to the sections included in the liquid ejecting apparatus 100. For example, the power source circuit 23 generates a power source potential VHV and an offset potential VBS. The offset potential VBS is supplied to the liquid ejection head 50. On the other hand, the power source potential VHV is supplied to the driving signal generation circuit 24.

The driving signal generation circuit 24 generates a driving signal Com for driving the driving elements 51*f*. Specifically, the driving signal generation circuit 24 includes a DA conversion circuit and an amplification circuit, for example. In the driving signal generation circuit 24, the DA conversion circuit converts a digital waveform specifying signal dCom supplied from the control circuit 21 into an analog signal, and the amplification circuit amplifies the analog signal using the power source potential VHV supplied from the power source circuit 23 so that the driving signal Com is generated. Here, a signal having a waveform, among waveforms included in the driving signal Com, that is actually supplied to the driving elements 51*f* corresponds to the supply signals Vin described above. The waveform specifying signal dCom is a digital signal for prescribing a waveform of the driving signal Com.

The control circuit 21 controls operations of the sections included in the liquid ejecting apparatus 100 by executing the programs stored in the storage circuit 22. Here, the control circuit 21 executes the programs so as to generate control signals Sk1 and Sk2, a print data signal SI, the waveform specifying signal dCom, a latch signal LAT, a change signal CNG, and a clock signal CLK as signals for controlling operations of the sections included in the liquid ejecting apparatus 100.

The control signal Sk1 controls driving of the transport mechanism 30. The control signal Sk2 controls driving of the movement mechanism 40. The print data signal SI is a digital signal for specifying operation states of the driving elements 51*f*. The latch signal LAT and the change signal CNG are timing signals that are used with the print data signal SI and prescribe an ink ejection timing of the nozzles of the head chip 51. The timing signals are generated based on an output of an encoder that detects a position of the carriage 41, for example.

A4: Concrete Configuration of Head Chip

Figure 3:
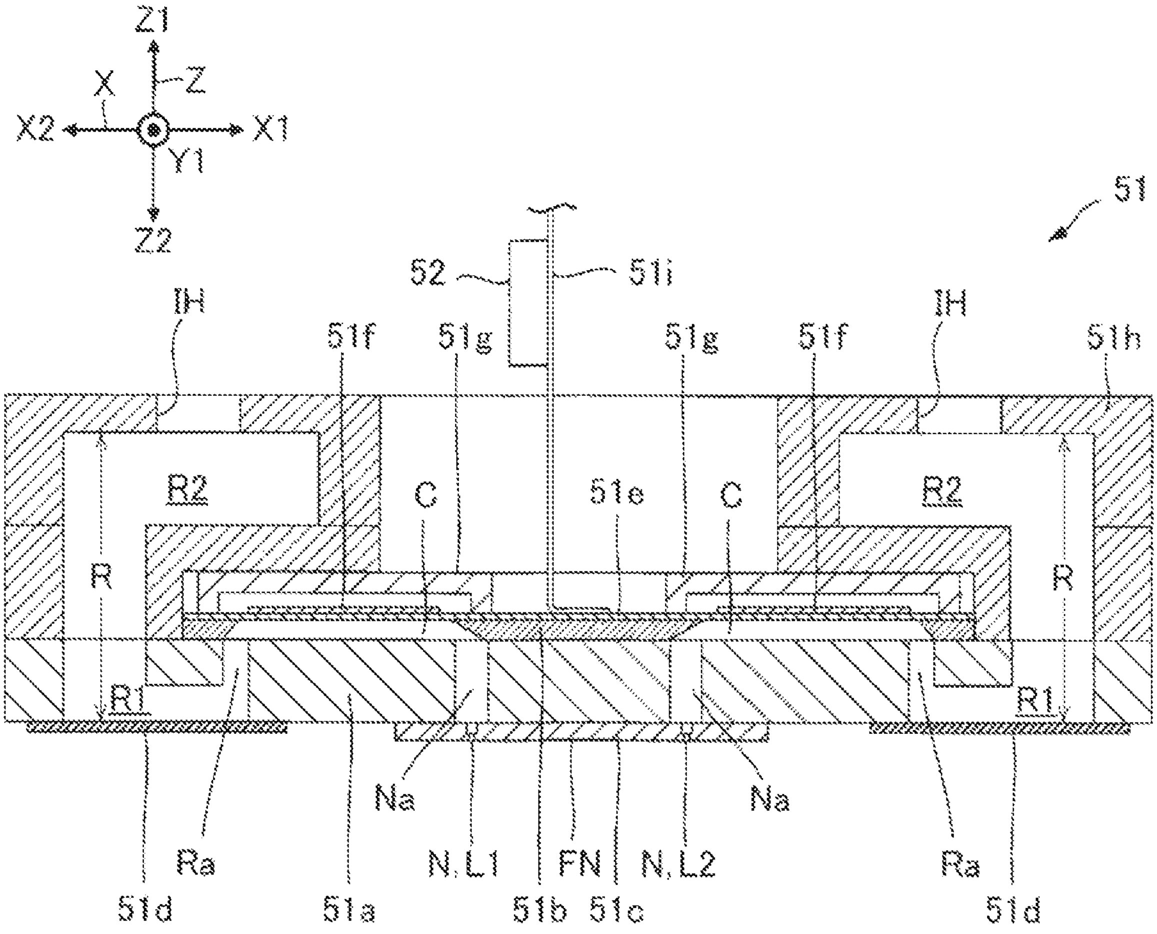
FIG. 3 is a cross-sectional view of an example of a head chip.

FIG. 3 is a cross-sectional view of an example of the head chip 51. As illustrated in FIG. 3, the head chip 51 includes a plurality of nozzles N arranged along the Y axis. The plurality of nozzles N are divided into a first line L1 and a second line L2 that are arranged along the X axis with an interval. Each of the first line L1 and the second line L2 is a group of a number of the nozzles N arranged in a straight manner along the Y axis.

The head chip 51 has a substantially symmetrical structure along the X axis. Note that positions of the plurality of nozzles N in the first line L1 and positions of the plurality of nozzles N in the second line L2 may coincide with each other or may be different from each other along the Y axis. In the example of FIG. 3, positions of the plurality of nozzles N in the first line L1 and positions of the plurality of nozzles N in the second line L2 coincide with each other along the Y axis.

As illustrated in FIG. 3, the head chip 51 includes a flow path substrate 51*a*, a pressure chamber substrate 51*b*, a nozzle plate 51*c*, a vibration absorber 51*d*, a vibration plate 51*e*, the plurality of driving elements 51*f*, a protection plate 51*g*, a case 51*h*, and a wiring substrate 51*i*.

The flow path substrate 51*a* and the pressure chamber substrate 51*b* are laminated in this order in the Z1 direction so as to form a flow path for supplying ink to the plurality of nozzles N. In a region positioned in the Z1 direction with respect to a lamination body formed by the flow path substrate 51*a* and the pressure chamber substrate 51*b*, the vibration plate 51*e*, the plurality of driving elements 51*f*, the protection plate 51*g*, the case 51*h*, and the wiring substrate 51*i* are disposed. On the other hand, in a region positioned in the Z2 direction with respect to the lamination body, the nozzle plate 51*c* and the vibration absorber 51*d* are disposed. The elements included in the head chip 51 are plate-like members schematically extending in the Y direction and are coupled to one another by an adhesive agent. Hereinafter, the elements included in the head chip 51 will be described in turn.

The nozzle plate 51*c* is a plate-like member having the plurality of nozzles N of the first and second lines L1 and L2 disposed thereon. Each of the plurality of nozzles N is a through hole through which ink passes. Here, a face of the nozzle plate 51*c* directing the Z2 direction is a nozzle face FN. The nozzle plate 51*c* is fabricated, for example, by processing a silicone monocrystalline substrate by means of a semiconductor fabrication technique using a processing technique, such as dry etching or wet etching. Note that other general methods and other general materials may be appropriately used in the fabrication of the nozzle plate 51*c*. Furthermore, although a cross-section surface of the nozzles has typically a circular shape, the present disclosure is not limited to this and the cross-section surface may have a polygonal shape or a non-circular shape, such as an oval shape.

The flow path substrate 51*a* has a space R1, a plurality of supply flow paths Ra, and a plurality of communication flow paths Na for each of the first line L1 and the second line L2. The spaces R1 is a long opening extending along the Y axis in a plan view along the Z axis. Each of the supply flow paths Ra and each of the communication flow paths Na are through holes formed for a corresponding one of the nozzles N. The individual supply flow paths Ra communicate with the space R1.

The pressure chamber substrate 51*b* is a plate-like member having a plurality of pressure chambers C, that are referred to as cavities, for each of the first and second lines L1 and L2. The plurality of pressure chambers C are arranged along the Y axis. Each of the pressure chambers C is formed for a corresponding one of the nozzles N and is a long space extending along the X axis in the plan view. Each of the flow path substrate 51*a* and the pressure chamber substrate 51*b* is fabricated by processing a silicone monocrystalline substrate by a semiconductor fabrication technique, for example, similarly to the nozzle plate 51*c* described above. Note that other general methods and other general materials may be appropriately used in the fabrication of the flow path substrate 51*a* and the pressure chamber substrate 51*b*.

The pressure chambers C are spaces located between the flow path substrate 51*a* and the vibration plate 51*e*. The plurality of pressure chambers C are arranged along the Y axis for each of the first and second lines L1 and L2. Furthermore, the pressure chambers C communicate with the communication flow paths Na and the supply flow paths Ra. Therefore, the pressure chambers C communicate with the nozzles N through the communication flow paths Na and communicate with the spaces R1 through the supply flow paths Ra.

The vibration plate 51*e* is disposed on a surface, which faces the Z1 direction, of the pressure chamber substrate 51*b*. The vibration plate 51*e* is a plate-like member that may be elastically vibrated. The vibration plate 51*e* has a first layer and a second layer, for example, which are laminated in the Z1 direction in this order. The first layer is an elastic film of silicone oxide ($SiO_2$), for example. The elastic film is formed by performing thermal oxidation on one surface of the silicone monocrystalline substrate. The second layer is an insulation film of zirconium oxide ($ZrO_2$), for example. The insulation film is formed by forming a zirconium layer by means of sputtering and performing thermal oxidation on the zirconium layer, for example. Note that the configuration of the vibration plate 51*e* is not limited to the lamination of the first and second layers described above, and may be a single layer or lamination of three or more layers.

The plurality of driving elements 51*f* corresponding to the nozzles N are disposed for each of the first line L1 and the second line L2 on a surface, that faces the Z1 direction, of the vibration plate 51*e*. Each of the driving elements 51*f* is a passive element that is deformed when a driving signal is supplied. Each of the driving elements 51*f* has a long shape extending along the X axis in the plan view. The plurality of driving elements 51*f* are arranged along the Y axis so as to correspond to the plurality of pressure chambers C. The driving elements 51*f* overlap with the pressure chambers C in the plan view.

Each of the driving elements 51*f* that is a piezoelectric element has a first electrode, a piezoelectric layer, and a second electrode, not illustrated, that are laminated in the Z1 direction in this order. One of the first and second electrodes is a discrete electrode, which is disposed away from other discrete electrodes of the corresponding driving elements 51*f* and receives a supply signal Vin applied thereto. The other of the first and second electrodes is a common electrode of a band shape extending along the Y axis that is continuous over the plurality of driving elements 51*f* and receives an offset potential VBS supplied thereto. Examples of metallic material of the electrodes include a platinum (Pt), aluminum (Al), nickel (Ni), Gold (Au), and Copper (Cu), and one of these materials or a combination of two or more of these materials as alloy, lamination, or the like may be used. The piezoelectric layer is formed of piezoelectric material, such as lead zirconate titanate ($Pb(Zr, Ti)O_3$) and has a band shape extending along the Y axis so as to be continuous over the plurality of driving elements 51*f*, for example. Note that the piezoelectric layer may be integrated over the plurality of driving elements 51*f*. In this case, the piezoelectric layer has through holes extending along the X axis through the piezoelectric layer in regions corresponding to gaps of the pressure chambers C that are adjacent to each other in the plan view. When the vibration plate 51*e* vibrates in accordance with deformation of the driving elements 51*f*, pressure in the pressure chambers C is changed so that ink is ejected from the nozzles N.

The protection plate 51*g* that is a plate-like member disposed on a surface, that faces the Z1 direction, of the vibration plate 51*e* protects the plurality of driving elements 51*f* and reinforces mechanical strength of the vibration plate 51*e*. Here, the plurality of driving elements 51*f* are accommodated between the protection plate 51*g* and the vibration plate 51*e*. The protection plate 51*g* is formed of a resin material, for example.

The case 51*h* is a member for storing ink to be supplied to the plurality of pressure chamber C. The case 51*h* is formed of a resin material, for example. The case 51*h* has spaces R2 for the respective first line L1 and the second line L2. The spaces R2 communicates with the spaces R1 described above, and function with the spaces R1 as reservoirs R for storing ink to be supplied to the plurality of pressure chambers C. The case 51*h* has inlets IH for supplying ink to the respective reservoirs R. The ink included in the reservoirs R are supplied to the pressure chambers C through the respective supply flow paths Ra.

The vibration absorber 51*d* that is also referred to as a compliance substrate and that is a flexible resin film forming wall surfaces of the reservoirs R absorbs a pressure change of the ink in the reservoirs R. Note that the vibration absorber 51*d* may be a metallic thin plate having flexibility. A surface, which faces the Z1 direction, of the vibration absorber 51*d* is attached to the flow path substrate 51*a* by an adhesive agent or the like.

The wiring substrate 51*i* is implemented on a surface, facing the Z1 direction, of the vibration plate 51*e* and is an implemented component used to electrically couples the control unit 20 to the head chip 51. The wiring substrate 51*i* is a flexible wiring substrate, such as a COF (Chip On Film), an FPC (Flexible Printed Circuit), or an FFC (Flexible Flat Cable). The switch circuit 52 used to supply a driving voltage to the individual driving elements 51*f* is implemented on the wiring substrate 51*i* of this embodiment.

A6: Driving of Driving Elements 51*f*

Figure 4:
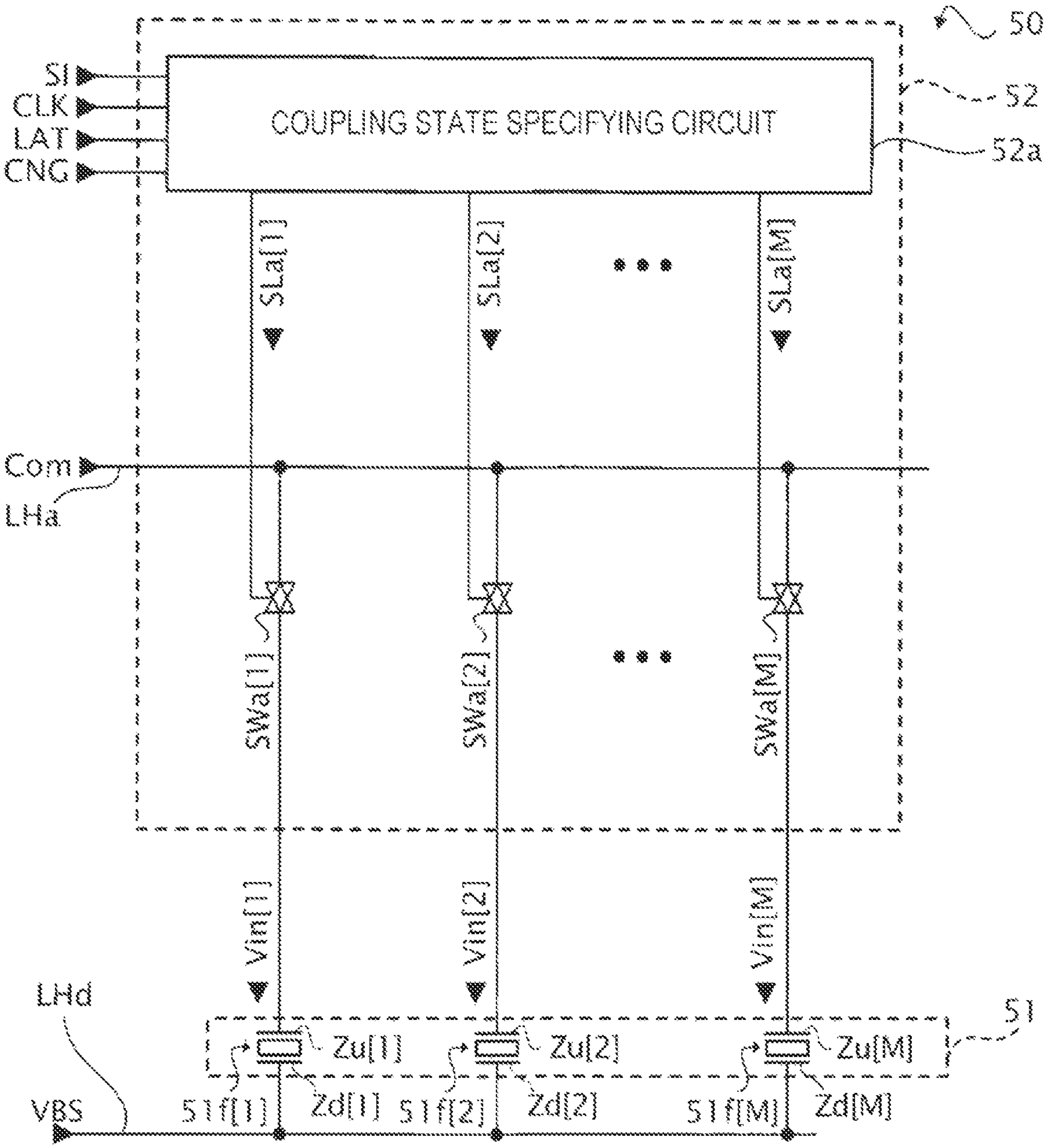
FIG. 4 is a diagram illustrating a switch circuit.

FIG. 4 is a diagram illustrating the switch circuit 52. The driving elements 51*f* are driven in accordance with supply signals Vin from the switch circuit 52. The switch circuit 52 will be described in detail hereinafter with reference to FIG. 4.

As illustrated in FIG. 4, a line LHa is coupled to the switch circuit 52. The line LHa is a signal line used to transmit the driving signal Com. Note that, in FIG. 4, one of the first electrode and the second electrode of each driving element 51*f* described above is indicated as an electrode Zd[m] and the other is indicated as an electrode Zu[m]. A line LHd is coupled to the electrode Zd[m]. The line LHd is a power supply line used to supply the offset potential VBS.

The switch circuit 52 includes M switches SWa (SWa[1] to SWa[M]) and a coupling state specifying circuit 52*a* that specifies coupling states of the switches.

The switch SWa[m] performs switching between a conductive (ON) state and a non-conductive (OFF) state between the line LHa for transmitting the driving signal Com and the electrode Zu[m] of the driving element 51*f*[m]. Each of the switches is a transmission gate, for example.

The coupling state specifying circuit 52*a* generates coupling state specifying signals SLa[1] to SLa[M] for specifying ON or OFF of the switches SWa[1] to SWa[M] based on the clock signal CLK, the print data signal SI, the latch signal LAT, and the change signal CNG that are supplied from the control circuit 21.

For example, although not illustrated, the coupling state specifying circuit 52*a* includes a plurality of transfer circuits, a plurality of latch circuits, and a plurality of decoders that correspond to the driving elements 51*f*[1] to 51*f*[M] one to one. In these components, the print data signal SI is supplied to the transfer circuits. Here, the print data signal SI includes discrete specifying signals for the respective driving elements 51*f* that are serially supplied. For example, the discrete specifying signals are transferred in turn to the plurality of transfer circuits in synchronization with the clock signal CLK. Furthermore, the latch circuits latch the discrete specifying signals supplied to the transfer circuits based on the latch signal LAT. Furthermore, the decoder generates the coupling state specifying signal SLa[m] based on the discrete specifying signals, the latch signal LAT, and the change signal CNG.

The switch SWa[m] is turned on or off in accordance with the coupling state specifying signal SLa[m] generated as described above. For example, the switch SWa[m] is turned on when the coupling state specifying signal SLa[m] is in a high level and turned off when the coupling state specifying signal SLa[m] is in a low level. As described above, the switch circuit 52 supplies a portion of or an entire waveform included in the driving signal Com as a supply signal Vin to at least selected one of the driving elements 51*f*.

A7: Driving Signal

Figure 5:
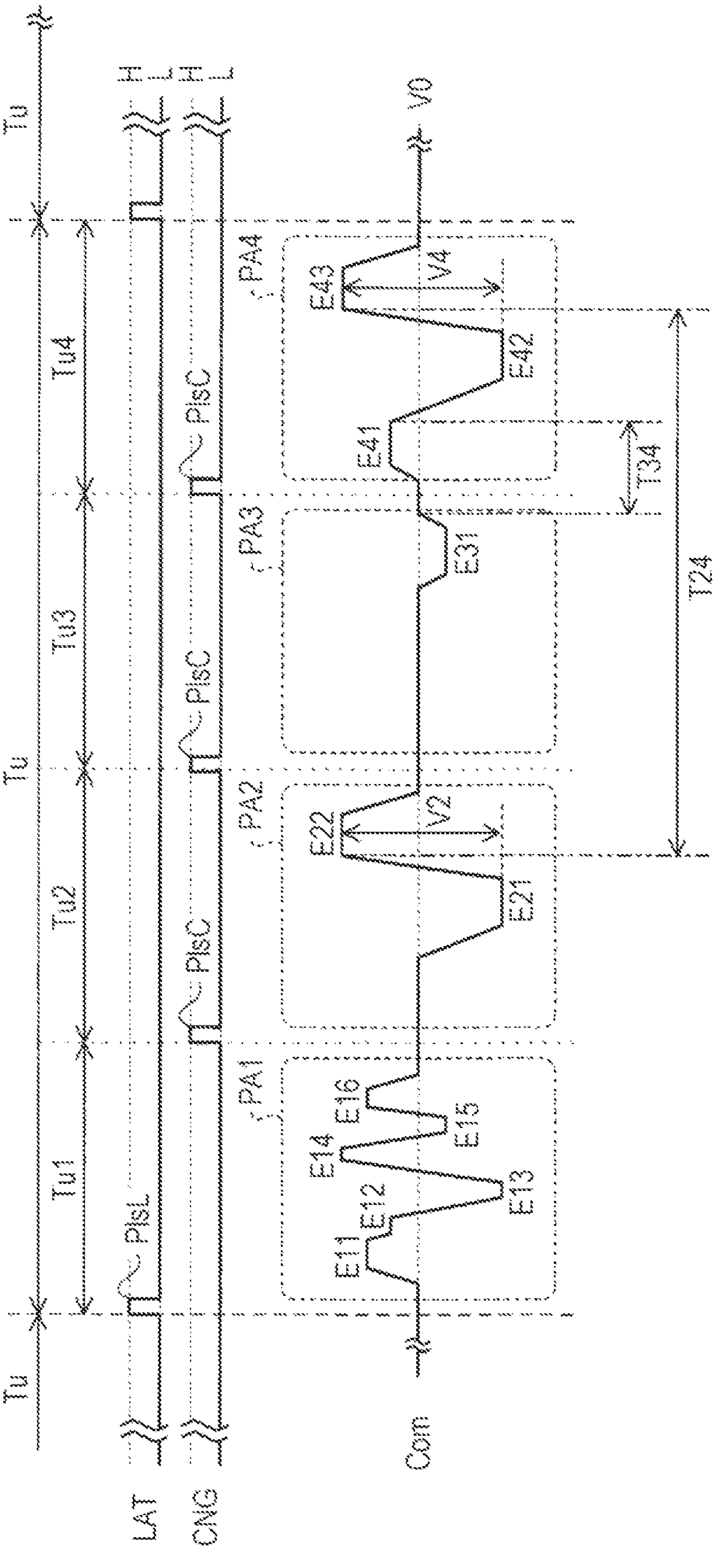
FIG. 5 is a diagram illustrating a driving signal used in the first embodiment.

FIG. 5 is a diagram illustrating the driving signal Com used in the first embodiment. As illustrated in FIG. 5, the latch signal LAT includes a pulse PlsL for prescribing a unit period Tu. The unit period Tu corresponds to a print cycle in which dots are formed on the medium M by ink ejected from the nozzles N. The unit period Tu is prescribed as a period from when a certain pulse PlsL rises to when a next pulse PlsL rises, for example. Although a detailed length or a detailed cycle period of the unit period Tu is not particularly limited, the length of the cycle period is approximately 80 microseconds, for example, in terms of both increase in printing speed and improvement in image quality.

The change signal CNG includes a pulse PlsC for dividing the unit period Tu into control periods Tu1 to Tu4. The control periods Tu1 to Tu4 are arranged in this order. The control period Tu1 is a period from when a certain pulse PlsL rises to when a first pulse PlsC rises, for example. The control period Tu2 is a period from when the first pulse PlsC rises to when a subsequent second pulse PlsC rises, for example. The control period Tu3 is a period from when the second pulse PlsC rises to when a subsequent third pulse PlsC rises, for example. The control period Tu4 is a period from when the third pulse PlsC rises to when a next pulse PlsL rises, for example. Note that, although the control periods Tu1 to Tu4 have the same length in the example of FIG. 5, the present disclosure is not limited to this and at least two of the control periods Tu1 to Tu4 may have time lengths different from each other.

The driving signal Com includes an ejection pulse PA1 in the control period Tu1, an ejection pulse PA2 in the control period Tu2, a non-ejection pulse PA3 in the control period Tu3, and an ejection pulse PA4 in the control period Tu4. Here, the ejection pulse PA2 is an example of a "first ejection pulse". The ejection pulse PA4 is an example of a "second ejection pulse". The ejection pulse PA1 is an example of a "third ejection pulse".

The ejection pulse PA1 is a potential pulse for driving the driving elements 51*f* so as to generate, in the pressure chambers C, a pressure change having such strength that ink is ejected from the nozzles N. When the ejection pulse PA1 is supplied to the driving elements 51*f*, a small amount of ink is ejected from the nozzles N as ink droplets.

In the example of FIG. 5, the ejection pulse PA1 has such a waveform that a reference potential V0 returns to the reference potential V0 through potentials E11 to E16 in this order. Here, the reference potential V0 is higher than the offset potential VBS, for example. The potentials E11, E12, E14, and E16 are higher than the reference potential V0. Furthermore, among the potentials E11, E12, E14, and E16, the potential E14 is the highest and the potential E12 is the lowest. The potentials E11 and E16 may be equal to each other or different from each other. The potentials E13 and Ely are lower than the reference potential V0. The potential E13 is lower than the potential E15. Note that the waveform of the ejection pulse PA1 is not limited to the example illustrated in FIG. 5 and is arbitrary.

The ejection pulse PA2 is a potential pulse for driving the driving elements 51*f* so as to generate, in the pressure chambers C, a pressure change having such strength that ink is ejected from the nozzles N. When the ejection pulse PA2 is supplied to the driving elements 51*f*, a medium amount of ink is ejected from the nozzles N as ink droplets.

In the example of FIG. 5, the ejection pulse PA2 has such a waveform that the reference potential V0 returns to the reference potential V0 through potentials E21 and E22 in this order. Here, the potential E21 is lower than the reference potential V0. On the other hand, the potential E22 is higher than the reference potential V0. A voltage amplitude V2 of the ejection pulse PA2 is a potential difference between the potentials E21 and E22. Note that the waveform of the ejection pulse PA2 is not limited to the example illustrated in FIG. 5 and may be the same as a waveform of the ejection pulse PA4, for example.

The non-ejection pulse PA3 is a potential pulse for driving the driving elements 51*f* so as to generate, in the pressure chambers C, a pressure change having such strength that ink is not ejected from the nozzles N. When the non-ejection pulse PA3 is supplied to the driving elements 51*f*, ink is not ejected from the nozzles N but meniscus of the ink in the nozzles N is finely vibrated.

In the example of FIG. 5, the non-ejection pulse PA3 has such a waveform that the reference potential V0 returns to the reference potential V0 through a potentials E31. Here, the potential E31 is lower than the reference potential V0. Furthermore, a timing of the potential E31 is later than a middle point of the control period Tu3. Note that a waveform of the non-ejection pulse PA3 is not limited to the example illustrated in FIG. 5 and may be through a potential higher than the reference potential V0, for example.

The ejection pulse PA4 is a potential pulse for driving the driving elements 51*f* so as to generate, in the pressure chambers C, a pressure change having such strength that ink is ejected from the nozzles N. When the ejection pulse PA4 is supplied to the driving elements 51*f*, a medium amount of ink is ejected from the nozzles N as ink droplets.

In the example of FIG. 5, the ejection pulse PA4 has such a waveform that the reference potential V0 returns to the reference potential V0 through potentials E41 to E43 in this order. The potentials E41 and E43 are higher than the reference potential V0. On the other hand, the potential E42 is lower than the reference potential V0. A voltage amplitude V4 of the ejection pulse PA4 is a potential difference between the potentials E43 and E42 and is equal to the voltage amplitude V2 of the ejection pulse PA2. Note that the waveform of the ejection pulse PA4 is not limited to the example illustrated in FIG. 5 and may be the same as the waveform of the ejection pulse PA2, for example. Furthermore, the voltage amplitude V4 of the ejection pulse PA4 may be different from the voltage amplitude V2 of the ejection pulse PA2.

The ejection pulses PA1, PA2, and PA4 and the non-ejection pulse PA3 are appropriately selected to be used for the supply signal Vin. By this, an amount of ink ejected from the nozzles N may be controlled or ink in the nozzles N may be finely vibrated without ejecting the ink from the nozzles N.

A8: First to Third Amounts

Figure 6:
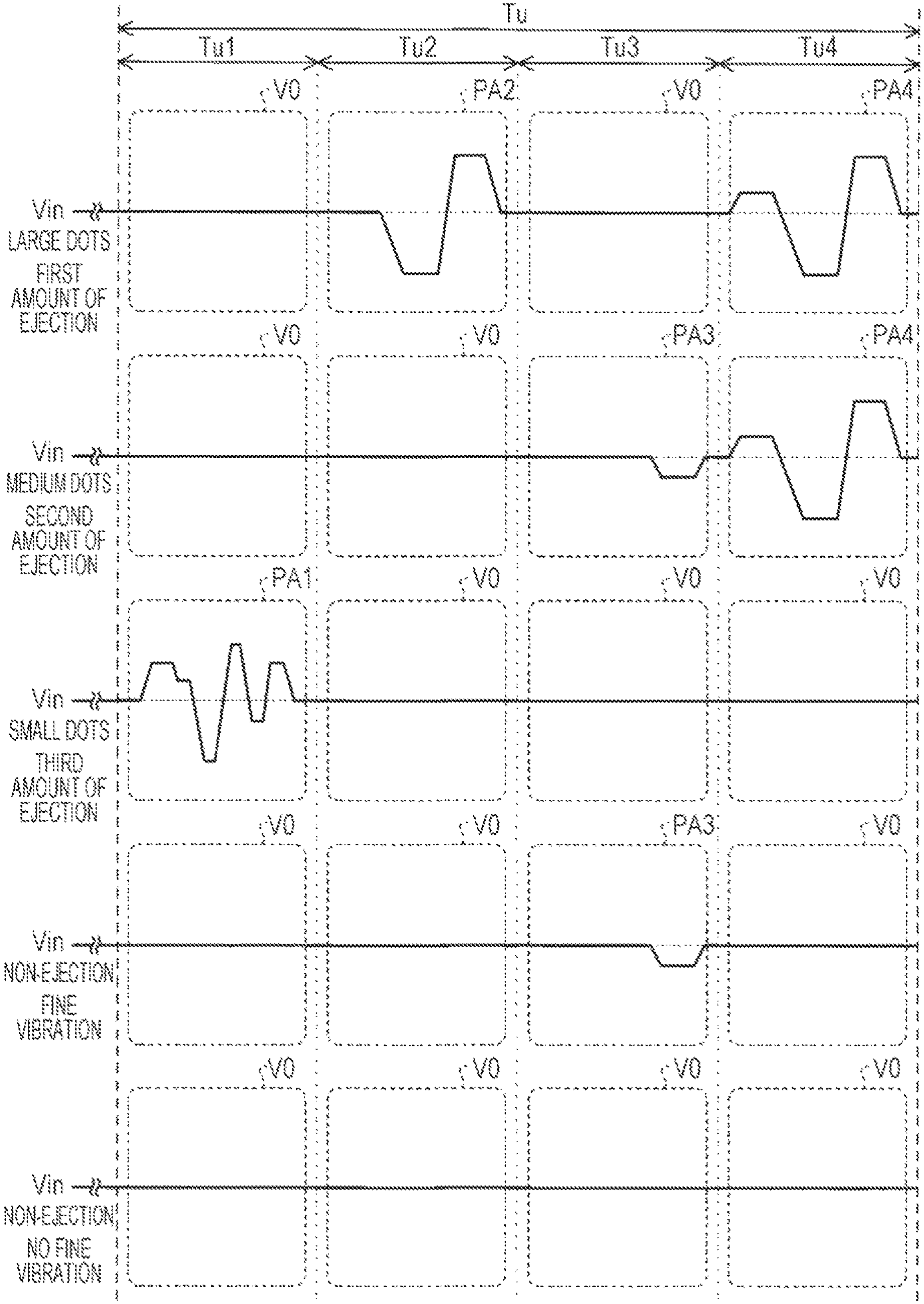
FIG. 6 is a diagram illustrating supply signals supplied from the switch circuit to the head chip.

FIG. 6 is a diagram illustrating the supply signal Vin supplied from the switch circuit 52 to the head chip 51. In FIG. 6, a waveform of the supply signal Vin obtained when large dots are formed on the medium M by a first amount of ink, a waveform of the supply signal Vin obtained when medium dots are formed on the medium M by a second amount of ink, a waveform of the supply signal Vin obtained when small dots are formed on the medium M by a third amount of ink, a waveform of the supply signal Vin obtained when ink in the nozzles N is finely vibrated without ejecting the ink from the nozzles N, and a waveform of the supply signal Vin obtained when ink is not ejected from the nozzles N while the ink in the nozzles N is not vibrated are illustrated.

When a large dot is formed on the medium M, the supply signal Vin in the unit period Tu has such a waveform that the ejection pulse PA2 is included in the control period Tu2 and the ejection pulse PA4 is included in the control period Tu4. Here, the supply signal Vin is maintained to be the reference potential V0 in the control periods Tu1 and Tu3.

When such a supply signal Vin is supplied to the driving elements 51*f*, a medium amount of ink droplet is consecutively ejected twice from the nozzles N. Consequently, the ink droplets are landed within a target range on the medium M, and a large dot is formed by the first amount of ink on the medium M. The first amount is larger than a sum of an amount of ink ejected from the nozzles N when only the ejection pulse PA2 is supplied to the driving elements 51*f* and an amount of ink ejected from the nozzles N when only the ejection pulse PA4 is supplied to the driving elements 51*f*. This will be described in detail hereinafter with reference to FIG. 9.

When medium dots are formed on the medium M, the supply signal Vin in the unit period Tu has such a waveform that the non-ejection pulse PA3 is included in the control period Tu3 and the ejection pulse PA4 is included in the control period Tu4. Here, the supply signal Vin is maintained to be the reference potential V0 in the control periods Tu1 and Tu2.

When such a supply signal Vin is supplied to the driving elements 51*f*, a medium amount of ink droplet is ejected from the nozzles N. Consequently, the ink droplets are landed within a target range on the medium M so that medium dots are formed by the second amount of ink that is smaller than the first amount of ink on the medium M. The second amount of ink is larger than an amount of ink ejected from the nozzles N obtained when only the ejection pulse PA4 is supplied to the driving elements 51*f*. This will be described in detail hereinafter with reference to FIG. 7.

When small dots are formed on the medium M, the supply signal Vin in the unit period Tu has such a waveform that the ejection pulse PA1 is included in the control period Tu1. Here, the supply signal Vin is maintained to be the reference potential V0 in the control periods Tu2 to Tu4.

When such a supply signal Vin is supplied to the driving elements 51*f*, a small amount of ink droplet is ejected from the nozzles N. Consequently, the ink droplet is landed on the medium M so that small dots are formed by the third amount of ink that is smaller than the second amount of ink on the medium M.

When the meniscus of the ink in the nozzles N is finely vibrated without ejecting the ink from the nozzles N, the supply signal Vin in the unit period Tu has such a waveform that the non-ejection pulse PA3 is included in the control period Tu3.

Since the supply signal Vin is supplied to the driving elements 51*f*, the ink is finely vibrated in the nozzles N without ejecting ink droplets from the nozzles N. In this case, dots are not formed on the medium M. The fine vibration may reduce viscosity of the ink in the nozzles N.

When the meniscus of the ink in the nozzles N is not finely vibrated and the ink is not ejected from the nozzles N, the supply signal Vin in the unit period Tu has such a waveform that the reference potential V0 is maintained over the control periods Tu1 to Tu4. Since such a supply signal Vin is supplied to the driving elements 51*f*, the ink is not finely vibrated in the nozzles N and the ink is not ejected from the nozzles N. Also in this case, dots are not formed on the medium M.

As described above, in an ejection period in which the ink is ejected from the nozzles N, the ejection pulses PA1, PA2, and PA4 and the non-ejection pulse PA3 are appropriately used. Furthermore, in a non-ejection period in which the ink is not ejected from the nozzles N, the non-ejection pulse PA3 is used while the ejection pulses PA1, PA2, and PA4 are not used or any of the ejection pulses PA1, PA2, PA4 and the non-ejection pulse PA3 is not used.

Furthermore, printing having a plurality of tones is performed using the large dots of the first amount of ink, the medium dots of the second amount of ink, and the small dots of the third amount of ink. Here, in terms of optimization of density difference among the plurality of tones, a difference between a rate of the second amount to the third amount and a rate of the first amount to the second amount is preferably equal to or smaller than 10%. In the same viewpoint, the first amount is preferably in a range from 1.8 times the second amount or more to 2.2 times the second amount or less, and the second amount is preferably in a range from 1.8 times the third amount or more to 2.2 times the third amount or less.

Figure 7:
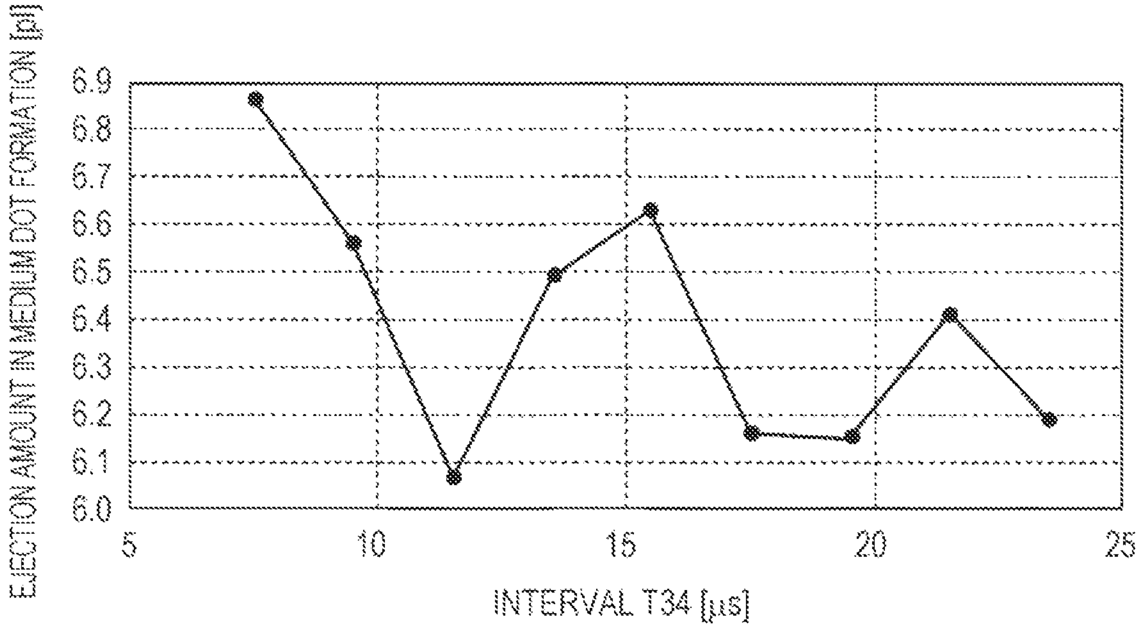
FIG. 7 is a graph illustrating the relationship between an interval between a non-ejection pulse and a second ejection pulse and an ejection amount at a time of formation of medium dots.

FIG. 7 is a graph illustrating the relationship between an interval T34 between the non-ejection pulse PA3 and the ejection pulse PA4 and an amount of ink ejected from the nozzles N by means of the non-ejection pulse PA3 and the ejection pulse PA4. The interval T34 is a time length from an end point of a contractile element indicating a change from the potential E31 of the non-ejection pulse PA3 described above to the reference potential V0 to a starting point of an expansion element indicating a change from the potential E41 of the ejection pulse PA4 described above to the potential E42.

As illustrated in FIG. 7, as the interval T34 becomes smaller, an ejection amount of at a time of formation of medium dots is increased. Here, as the interval T34 is increased, reduction and increase in an ejection amount at the time of formation of medium dots are repeated so that a plurality of local maximal values are gradually reduced. This corresponds to influence of vibration of the meniscus in the nozzles N. Accordingly, an effect of increase in the ejection amount at the time of formation of medium dots is attained when vibration of the meniscus of the ink in the nozzles N caused by the non-ejection pulse PA3 contributes ejection of ink from the nozzles N caused by the ejection pulse PA4. Therefore, the interval T34 is preferably a quarter of a characteristic vibration period of the meniscus of the ink in the nozzles N or less. The characteristic vibration period of the meniscus of the ink in the nozzles N is, for example, equal to or larger than approximately 80 microseconds and equal to or smaller than approximately 120 microseconds. Furthermore, an interval among the plurality of local maximal values corresponds to a characteristic vibration period of the ink in flow paths extending from the supply flow paths Ra to the nozzles N. In the example of FIG. 7, the interval of the local maximal values or the characteristic vibration period is approximately 6 microseconds to approximately 9 microseconds.

As is apparent from the description above, in terms of increase in the ejection amount at the time of formation of medium dots, the interval T34 is preferably a quarter of the characteristic vibration period of the meniscus of the ink in the nozzles N or less and an integral multiple of the characteristic vibration period of the ink in the flow paths from the supply paths Ra to the nozzles N, and furthermore, is preferably one time the characteristic vibration period of the ink in the flow paths from the supply flow paths Ra to the nozzles N.

Figure 8:
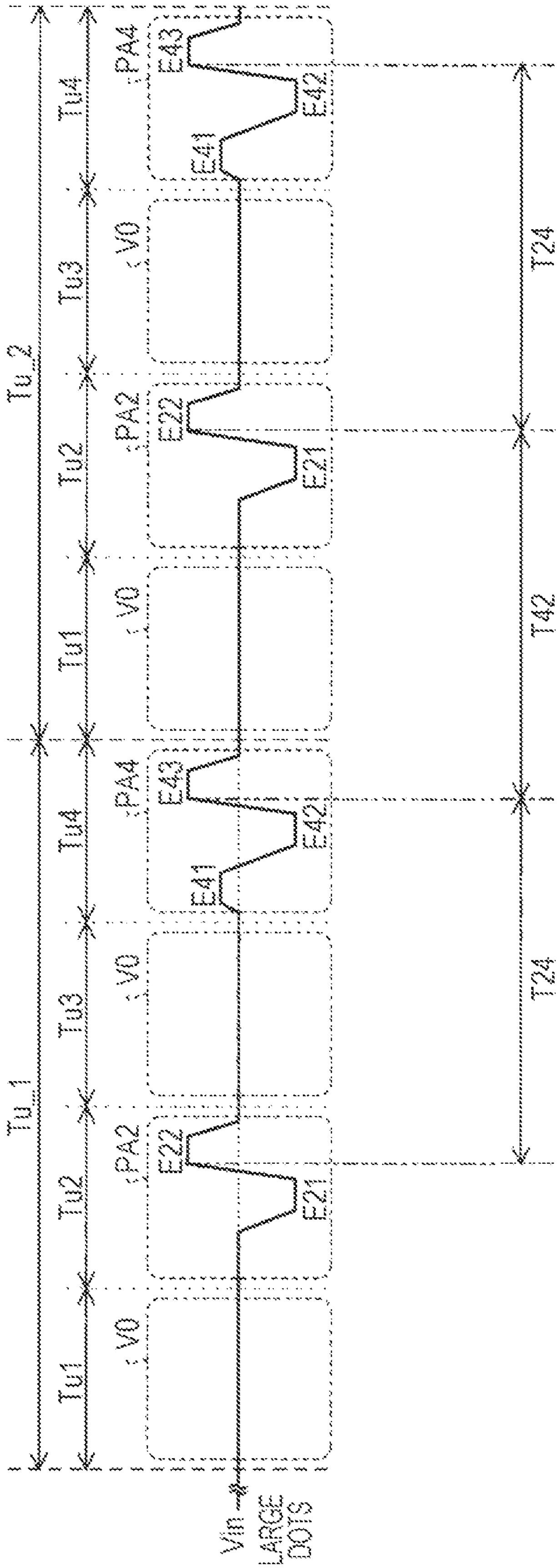
FIG. 8 is a diagram illustrating a supply signal obtained when large dots are formed by a first amount of ink in two consecutive unit periods, that is, first and second periods.

FIG. 8 is a diagram illustrating the supply signal Vin obtained when large dots are formed by the first amount of ink in each of two consecutive unit periods Tu, that is, first and second periods Tu_1 and Tu_2.

As illustrated in FIG. 8, in a period from a starting point of the first period Tu_1 to an end point of the second period Tu_2, the ejection pulse PA2 and the ejection pulse PA4 alternately appear. In each of the first and second periods Tu_1 and Tu_2, the control period Tu3 exists between the ejection pulse PA2 and the ejection pulse PA4. Therefore, when compared with a case where the control period Tu3 does not exist, an interval T24 between the ejection pulse PA2 and the ejection pulse PA4 in each of the first and second periods Tu_1 and Tu_2 may be large. The interval T24 is a time length from an end point of a contractile element indicating a change from the potential E21 of the ejection pulse PA2 described above to the potential E22 to an end point of a contractile element indicating a change from the potential E42 of the ejection pulse PA4 described above to the potential E43.

The control period Tu1 of the second period Tu_2 exists between the ejection pulse PA4 of the first period Tu_1 and the ejection pulse PA2 of the second period Tu_2. Therefore, when compared with a case where the control period Tu1 does not exist, an interval T42 between the ejection pulse PA4 in the first period Tu_1 and the ejection pulse PA2 in the second period Tu_2 may be large. The interval T42 is a time length from the end point of the contractile element indicating a change from the potential E42 of the ejection pulse PA4 described above to the potential E43 to an end point of a contractile element indicating a change from the potential E21 of the ejection pulse PA2 described above to the potential E22. In the example illustrated in FIG. 8, the intervals T24 and T42 are equal to each other.

As described above, also by reducing the unit period Tu, the intervals T24 and T42 may be individually increased. As a result, the ejection amount at the time of formation of large dots may be increased. Hereinafter, this point will be described with reference to FIG. 9.

Figures 9, 10:
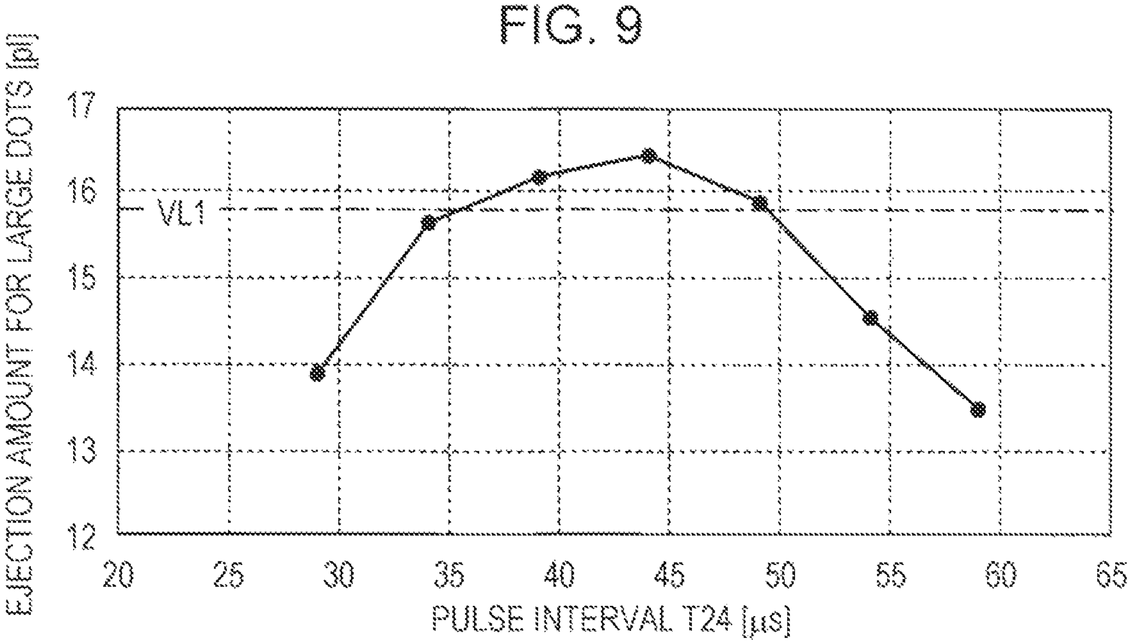
FIG. 9 is a graph illustrating the relationship between an interval between a first ejection pulse and the second ejection pulse and an ejection amount at a time of formation of large dots.
FIG. 10 is a diagram illustrating the relationship between order of pulses in the unit period of the driving signal and effects.

FIG. 9 is a graph illustrating the relationship between the interval T24 between the ejection pulse PA2 and the ejection pulse PA4 and an ejection amount at a time of formation of large dots. The ejection amount in FIG. 9 is an average value of ejection amounts in the first and second periods Tu_1 and Tu_2 obtained when large dots are formed by the first amount of ink in the individual first and second periods Tu_1 and Tu_2. Furthermore, increase in the interval T24 in FIG. 9 indicates reduction in the interval T42.

As illustrated in FIG. 9, as the interval T24 becomes close to the interval T42, that is, as a difference between the interval T24 and the interval T42 becomes smaller, an ejection amount at the time of formation of large dots is increased. Here, when the interval T24 and the interval T42 are the same as each other, an ejection amount at the time of formation of large dots is largest and a local maximum. An effect of increase in the ejection amount at the time of formation of large dots is attained when vibration of the meniscus of the ink in the nozzles N caused by the ejection pulse PA2 contributes ejection of ink from the nozzles N caused by the ejection pulse PA4. Therefore, in terms of increase in an ejection amount at the time of formation of large dots, each of the interval T24 and the interval T42 is preferably 0.4 times the characteristic vibration period of the meniscus of the ink in the nozzles N or more and 0.6 times or less and more preferably 0.40 times the characteristic vibration period or more and 0.54 times or less. When the intervals T24 and T42 are within this range, the ejection amount may be larger than an amount VL1.

A9: Orders of Pulses and Effects

Hereinafter, orders of the ejection pulses PA1, PA2, and PA4 and the non-ejection pulse PA3 and effects thereof will be described with reference to FIG. 10.

FIG. 10 is a diagram illustrating the relationship between orders of pulses in the unit period Tu of the driving signal Com and effects thereof. FIG. 10 illustrates whether different orders of the ejection pulses PA1, PA2, and PA4 and the non-ejection pulse PA3, which are indicated by sample numbers 1 to 12, have effects. In FIG. 10, in a column "large dots", "P" is described when increase in an ejection amount at the time of formation of large dots is recognized. In FIG. 10, in a column "medium dots", "P" is described when increase in an ejection amount at the time of formation of medium dots is recognized. In FIG. 10, in a column "small dots", "P" is described when a speed of ejection of the ink from the nozzle N may be reduced at the time of formation of small dots.

As illustrated in FIG. 10, the increase in an ejection amount at the time of formation of large dots is recognized in the samples of Nos. 3, 5, 8, and 11. The increase in an ejection amount at the time of formation of medium dots is recognized in the samples of Nos. 4, 5, and 8 to 11. Reduction in the speed of ejection of the ink from the nozzles N at the time of formation of small dots is realized in the samples of Nos. 7 to 9 and 12.

Here, the sample of No. 8 corresponds to this embodiment, that is, increase in ejection amounts at the time of the formation of large dots and the formation of medium dots is recognized, and in addition, the speed of ejection of the ink from the nozzles N at the time of formation of small dots may be reduced. Furthermore, as for each of the samples of No. 5 and 11, the speed of ejection of the ink from the nozzles N at the time of formation of small dots may not be reduced, but increase in ejection amounts at the time of the formation of large dots and at the time of formation of medium dots is recognized. Note that the sample of No. 5 corresponds to a second embodiment described below. The sample of No. 11 corresponds to a third embodiment described below.

A10: Conclusion of First Embodiment

The liquid ejecting apparatus 100 described above includes the nozzles N, the pressure chambers C, the driving elements 51*f*, the driving signal generation circuit 24 that is an example of a "driving signal generation section", and the control circuit 21 that is an example of a "controller" as described above. The nozzles N eject ink that is an example of "liquid". The pressure chambers C communicate with the nozzles N. The driving elements 51*f* apply a pressure change to the ink in the pressure chambers C in accordance with the driving signal Com. The driving signal generation circuit 24 generates the driving signal Com. The control circuit 21 controls supply of the driving signal Com to the driving elements 51*f* for each unit period Tu of a predetermined cycle period.

The driving signal Com includes the ejection pulse PA2 that is an example of a "first ejection pulse", the ejection pulse PA4 that is an example of a "second ejection pulse", and the non-ejection pulse PA3 at different timings as described above in the unit period Tu. Each of the ejection pulses PA2 and PA4 drives the driving elements 51*f* so that the ink is ejected from the nozzles N. On the other hand, the non-ejection pulse PA3 drives the driving elements 51*f* without ejecting the ink from the nozzles N.

Taking this into consideration, the control circuit 21 selects the ejection pulses PA2 and PA4 as pulses to be supplied to the driving elements 51*f* when the first amount of ink is to be ejected from the nozzles N in the unit period Tu. Furthermore, the control circuit 21 selects the non-ejection pulse PA3 and the ejection pulse PA4 as pulses to be supplied to the driving elements 51*f* when the second amount of ink that is smaller than the first amount of ink is to be ejected from the nozzles N in the unit period Tu. The second amount of ink is larger than an amount of ink ejected from the nozzles N by supplying only the ejection pulse PA4 to the driving elements 51*f*.

In the liquid ejecting apparatus 100 described above, since the second amount is larger than the amount of ink ejected from the nozzles N when only the ejection pulse PA4 is supplied to the driving elements 51*f*, there is an advantage in that the first amount and the second amount are appropriately balanced with ease when compared with a configuration in which the amount of ink ejected from the nozzles N when only the ejection pulse PA4 is supplied to the driving elements 51*f* and the second amount are equal to each other. Here, when the second amount of ink is to be ejected from the nozzles N, use of the non-ejection pulse PA3 in addition to the ejection pulse PA4, or in particular, consecutive use of the non-ejection pulse PA3 and the ejection pulse PA4 in this order, causes the second amount of ink to be larger than the amount of ink ejected from the nozzles N by supplying only the ejection pulse PA4 to the driving elements 51*f*.

Furthermore, in the unit period Tu, the ejection pulse PA2, the non-ejection pulse PA3, and the ejection pulse PA4 may be arranged in this order. Therefore, even when intervals of the pulses are short, when the first amount of ink is ejected from the nozzles N, the non-ejection pulse PA3 for ensuring the second amount of ink may be arranged between the ejection pulse PA2 and the ejection pulse PA4 while an interval between the ejection pulses PA2 and PA4 is set such that ejection of ink from the nozzles N by the succeeding ejection pulse PA4 is not unexpectedly affected by residual vibration of the meniscus of the ink in the nozzles N caused by the preceding ejection pulse PA2 and the interval is set so that a sufficient first amount of ejection is ensured. Consequently, reduction of the first amount of ink caused by unexpected influence may be suppressed and the second amount of ink may be ensured. Accordingly, even when a print speed is increased, differences of densities of a plurality of tones may be optimized.

Here, as described above, the first amount is larger than a sum of an amount of ink ejected from the nozzles N when only the ejection pulse PA2 is supplied to the driving elements 51*f* and an amount of ink ejected from the nozzles N when only the ejection pulse PA4 is supplied to the driving elements 51*f*. Therefore, when compared with a configuration in which the first amount is equal to the sum, a difference between the first amount and the second amount may be increased. Furthermore, the consecutive use of the non-ejection pulse PA3 and the ejection pulse PA4 in this order causes the second amount of ink to be larger than the amount of ink ejected from the nozzles N by supplying only the ejection pulse PA4 to the driving elements 51*f*, and therefore, a rate of the second amount to the first amount may be optimized so that density differences of the tones may be optimized.

In terms of increase in a difference between the first amount and the second amount, the interval T24 between the ejection pulses PA2 and PA4 in the unit period Tu is preferably in a range from 0.4 times the characteristic vibration period or more of the meniscus of the ink in the nozzles N and 0.6 times the characteristic vibration period or less as described above.

In this case, when the first amount of ink is ejected from the nozzles N, ejection of the ink from the nozzles N by a preceding pulse selected from among the ejection pulses PA2 and PA4 effectively utilizes the residual vibration of the meniscus of the ink in the nozzles N by the preceding pulse so that the first amount of ink is large. Consequently, the first amount is larger than a sum of an amount of ink ejected from the nozzles N when only the ejection pulse PA2 is supplied to the driving elements 51*f* and an amount of ink ejected from the nozzles N when only the ejection pulse PA4 is supplied to the driving elements 51*f*.

In this embodiment, as described above, a timing of the ejection pulse PA4 comes after a timing of the ejection pulse PA2 in the unit period Tu. Assuming here that each of the first period Tu_1 and the second period Tu_2 after the first period Tu_1 is the unit period Tu, when the first amount of ink is ejected from the nozzles N in each of the first period Tu_1 and the second period Tu_2, an interval between the ejection pulse PA4 in the first period Tu_1 and the ejection pulse PA2 in the second period Tu_2 is preferably in a range from 0.4 times the characteristic vibration period of the meniscus of the ink in the nozzles N or more and 0.6 times the characteristic vibration period or less in terms of increase in the difference between the first and second amounts.

In this case, when the first amount of ink is ejected from the nozzles N, ejection of the ink from the nozzles N by the ejection pulse PA2 effectively utilizes the residual vibration of the meniscus of the ink in the nozzles N by the ejection pulse PA4 so that the first amount of ink is large in both the consecutive first and second periods Tu_1 and Tu_2. Consequently, in both the consecutive first and second periods Tu_1 and Tu_2, the first amount is larger than a sum of an amount of ink ejected from the nozzles N when only the ejection pulse PA2 is supplied to the driving elements 51*f* and an amount of ink ejected from the nozzles N when only the ejection pulse PA4 is supplied to the driving elements 51*f*.

Furthermore, as described above, the voltage amplitude V2 of the ejection pulse PA2 and the voltage amplitude V4 of the ejection pulse PA4 are equal to each other. Therefore, generation of the driving signal Com is easier when compared with a configuration in which the voltage amplitude V2 of the ejection pulse PA2 is different from the voltage amplitude V4 of the ejection pulse PA4. Furthermore, a large first amount may be attained by increasing the voltage amplitude V2 of the ejection pulse PA2 and the voltage amplitude V4 of the ejection pulse PA4 to largest voltage amplitudes that are available in terms of the configuration of the liquid ejecting apparatus 100.

Furthermore, as described above, a timing of the non-ejection pulse PA3 comes immediately before the timing of the ejection pulse PA4 in the unit period Tu. Therefore, an amount of ink ejected from the nozzles N caused by the ejection pulse PA4 may be increased using the vibration of the meniscus caused by the non-ejection pulse PA3. Consequently, the second amount of ink is larger than an amount of ink ejected from the nozzles N by supplying only the ejection pulse PA4 to the driving elements 51*f*.

Furthermore, as described above, the timing of the ejection pulse PA2 comes immediately before the timing of the non-ejection pulse PA3 in the unit period Tu. Therefore, the non-ejection pulse PA3 and the ejection pulse PA4 may be consecutively used in this order.

Furthermore, as described above, the driving signal Com includes the ejection pulse PA1 that is an example of a "third ejection pulse" in the unit period Tu at a timing different from the timings of the ejection pulse PA2, the ejection pulse PA4, and the non-ejection pulse PA3. The ejection pulse PA1 drives the driving elements 51*f* so that the ink is ejected from the nozzles N. The control circuit 21 selects the ejection pulse PA1 as a pulse to be supplied to the driving elements 51*f* when the third amount of ink that is smaller than the second amount of ink is to be ejected from the nozzles N in the unit period Tu. Therefore, the number of tones may be increased when compared with a configuration in which the third amount is not used.

In this embodiment, as described above, the ejection pulse PA1, the ejection pulse PA2, the non-ejection pulse PA3, and the ejection pulse PA4 are arranged in this order in the unit period Tu. Therefore, the non-ejection pulse PA3 and the ejection pulse PA4 may be consecutively used in this order and the interval between the ejection pulse PA2 and the ejection pulse PA4 may be optimized. Furthermore, when compared with a configuration in which a timing of the ejection pulse PA1 comes after one of the timings of the other pulses, even when an ejection speed of the ink from the nozzles N by the ejection pulse PA1 is lowered, dots of the third amount of ink may be landed at desired positions corresponding to dots landing positions of dots of the first and second amounts of ink on the medium M. Accordingly, a degree of freedom of a waveform design of the ejection pulse PA1 may be improved. Consequently, tailing of the ink from the nozzles N by the ejection pulse PA1 may be reduced. Furthermore, in the first period Tu_1 and the second period Tu_2 that comes immediately after the first period Tu_1, the ejection pulse PA1 for ejecting the third amount of ink may be arranged between the preceding ejection pulse PA4 and the succeeding ejection pulse PA2 while an interval between the ejection pulses PA4 in the first period Tu_1 and the ejection pulse PA2 in the second period Tu_2 is set such that ejection of ink from the nozzles N by the succeeding ejection pulse PA2 is not unexpectedly affected by residual vibration of the meniscus of the ink in the nozzles N caused by the preceding ejection pulse PA4 and the interval is set so that a sufficient first amount of ejection is ensured. Accordingly, the ejection pulse PA1, the ejection pulse PA2, the non-ejection pulse PA3, and the ejection pulse PA4 may be arranged at appropriate timings without extending the unit period Tu.

Here, as described above, when the second amount is within a range from 1.8 times the third amount or more and 2.2 times the third amount or less, it is advantageous in that tone balance by the second amount and the third amount is easily optimized.

Furthermore, as described above, when a difference between a rate of the second amount to the third amount and a rate of the first amount to the second amount is 10% or less, it is advantageous in that tone balance by the first to third amounts is easily optimized.

Furthermore, as described above, when the first amount is within a range from 1.8 times the second amount or more and 2.2 times the second amount or less, it is advantageous that tone balance by the first amount and the second amount is easily optimized.

Furthermore, as described above, the control circuit 21 selects the non-ejection pulse PA3 as a pulse to be supplied to the driving elements 51*f* when the driving elements 51*f* are driven without ejecting ink from the nozzles N in the unit period Tu. Therefore, viscosity of the ink in the nozzles N or the like may be reduced by vibrating the meniscus of the ink in the nozzles N without ejecting the ink from the nozzles N.

B: Second Embodiment

Hereinafter, a second embodiment of the present disclosure will be described. In the embodiment described hereinafter, component having the same operations and the same functions as those in the first embodiment are denoted by reference numerals used in the description of the first embodiment and detailed descriptions thereof are appropriately omitted.

Figure 11:
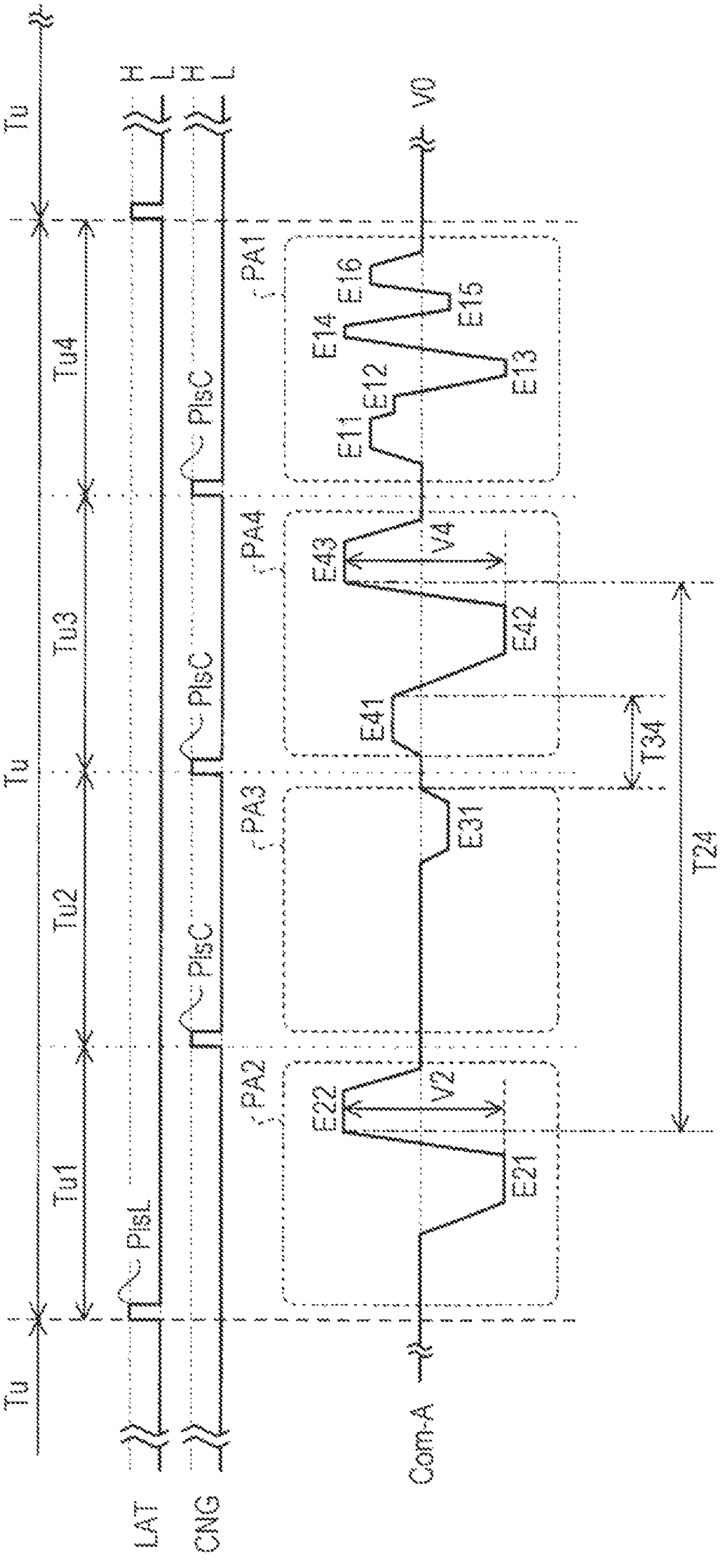
FIG. 11 is a diagram illustrating a driving signal used in a second embodiment.

FIG. 11 is a diagram illustrating a driving signal Com-A used in the second embodiment. The driving signal Com-A is the same as the driving signal Com of the first embodiment except for timings of pulses in a unit period Tu.

The driving signal Com-A includes an ejection pulse PA2 in a control period Tu1, a non-ejection pulse PA3 in a control period Tu2, an ejection pulse PA4 in a control period Tu3, and an ejection pulse PA1 in a control period Tu4. Here, a period T24 and a period T34 are set similarly to those of the driving signal Com of the first embodiment.

Also according to the second embodiment, as with the first embodiment described above, even when a print speed is increased, density differences of a plurality of tones may be optimized. Since the ejection pulse PA1 is included in the control period Tu4 in this embodiment, when small dots are formed, an ejection speed of ink from nozzles N corresponding to landed positions of dots of a first amount and dots of a second amount is required to be increased when compared with the first embodiment. Consequently, accuracy of landing of the ink forming the small dots on the medium M may be improved.

C: Third Embodiment

Hereinafter, a third embodiment of the present disclosure will be described. In the embodiment described hereinafter, component having the same operations and the same functions as those in the first embodiment are denoted by reference numerals used in the description of the first embodiment and detailed descriptions thereof are appropriately omitted.

Figure 12:
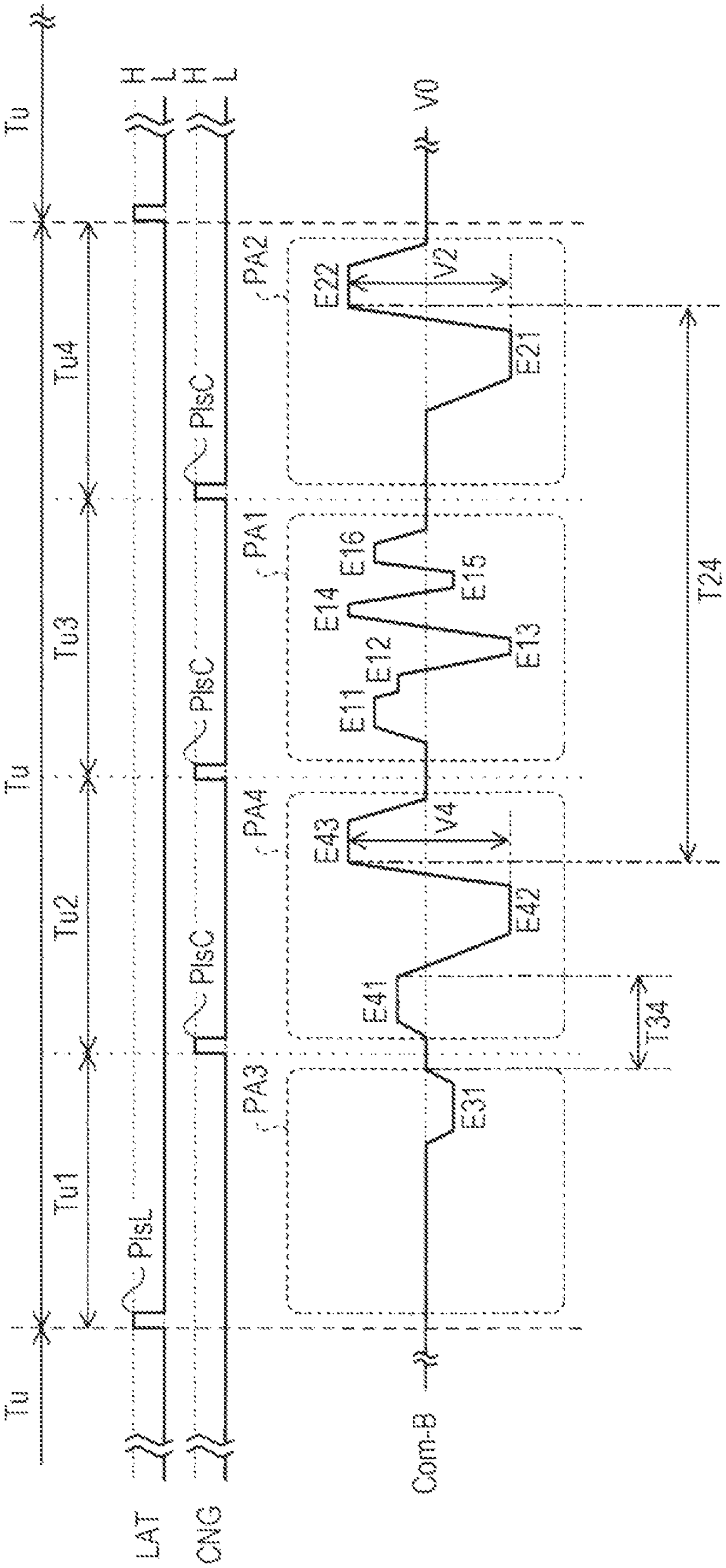
FIG. 12 is a diagram illustrating a driving signal used in a third embodiment.

FIG. 12 is a diagram illustrating a driving signal Com-B used in the third embodiment. The driving signal Com-B is the same as the driving signal Com of the first embodiment except for timings of pulses in a unit period Tu.

The driving signal Com-B includes a non-ejection pulse PA3 in a control period Tu1, an ejection pulse PA4 in a control period Tu2, an ejection pulse PA1 in a control period Tu3, and an ejection pulse PA2 in a control period Tu4. Here, a period T24 and a period T34 are set similarly to those of the driving signal Com of the first embodiment.

Also according to the third embodiment, as with the first embodiment described above, even when a print speed is increased, density differences of a plurality of tones may be optimized. Since the ejection pulse PA1 is included in the control period Tu3 in this embodiment, an ejection speed of ink from nozzles N corresponding to landed positions of dots of a first amount and dots of a second amount is required to be increased when compared with the first embodiment. Consequently, accuracy of landing of the ink forming the small dots on the medium M may be improved. Furthermore, in this embodiment, as described above, the non-ejection pulse PA3, the ejection pulse PA4, the ejection pulse PA1, and the ejection pulse PA2 are arranged in this order in the unit period Tu. Therefore, the non-ejection pulse PA3 and the ejection pulse PA4 may be consecutively used in this order in the unit period Tu and an interval T24 between the ejection pulse PA4 and the ejection pulse PA2 may be optimized.

D: Fourth Embodiment

Hereinafter, a fourth embodiment of the present disclosure will be described. In the embodiment described hereinafter, component having the same operations and the same functions as those in the first embodiment are denoted by reference numerals used in the description of the first embodiment and detailed descriptions thereof are appropriately omitted.

Figure 13:
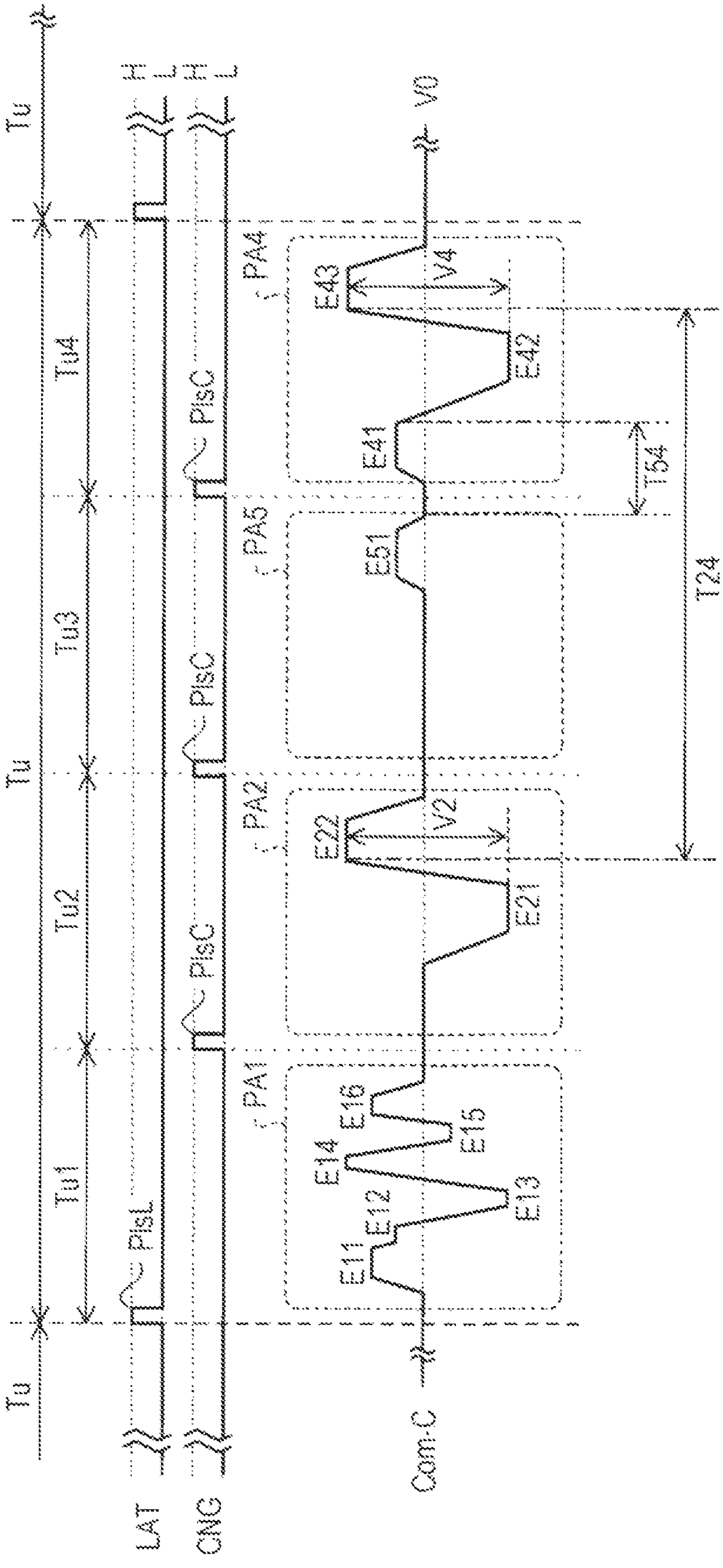
FIG. 13 is a diagram illustrating a driving signal used in a fourth embodiment.

FIG. 13 is a diagram illustrating a driving signal Com-C used in the fourth embodiment. The driving signal Com-C is the same as the driving signal Com of the first embodiment except that a non-ejection pulse PA5 is used instead of the non-ejection pulse PA3.

The non-ejection pulse PA5 is a potential pulse for driving the driving elements 51*f* so as to generate, in the pressure chambers C, a pressure change having such strength that ink is not ejected from the nozzles N. When the non-ejection pulse PA5 is supplied to the driving elements 51*f*, ink is not ejected from the nozzles N but meniscus of the ink in the nozzles N is finely vibrated.

In the example of FIG. 13, the non-ejection pulse PA5 has such a waveform that a reference potential V0 returns to the reference potential V0 through a potential E51. Here, the potential E51 is higher than the reference potential V0. Furthermore, a timing of the potential E51 is later than a middle point of a control period Tu3.

As an interval T54 between the non-ejection pulse PA5 and the ejection pulse PA4 becomes smaller, an ejection amount at a time of formation of medium dots is increased. The interval T54 is a time length from an end point of an expansion element indicating a change from a potential E51 to the reference potential V0 of the non-ejection pulse PA5 described above to a starting point of an expansion element indicating a change from a potential E41 to a potential E42 of the ejection pulse PA4 described above.

Although not illustrated, as with the interval T34 of the first embodiment described above, as the interval T54 is increased, an ejection amount at a time of formation of medium dots is reduced while a plurality of local maximal values appear. This corresponds to influence of vibration of the meniscus in the nozzles N. Accordingly, an effect of increase in the ejection amount at the time of formation of medium dots is attained when vibration of the meniscus of the ink in the nozzles N caused by the non-ejection pulse PA5 contributes ejection of ink from the nozzles N caused by the ejection pulse PA4. Therefore, the interval T54 is preferably a quarter of a characteristic vibration period of the meniscus of the ink in the nozzles N or less. However, the non-ejection pulse PA5 has such a waveform that the non-ejection pulse PA3 of the first embodiment described above is inverted, and therefore, the interval T54 is preferably (integer—0.5) times a characteristic vibration period of ink in communication flow paths Na in terms of increase in the ejection amount at the time of formation of medium dots, and more preferably 0.5 times the characteristic vibration period of the ink in the communication flow paths Na.

Also according to the fourth embodiment, as with the first embodiment described above, even when a print speed is increased, density differences of a plurality of tones may be optimized.

E: Modifications

The embodiments illustrated above may be modified in various ways. Detailed descriptions of modes of modifications that may be applied to the embodiments described above will be illustrated hereinafter. The modes arbitrarily selected from among examples below may be appropriately combined as long as the modes are consistent.

E1: First Modification

Although, in the embodiments described above the nozzles N comprises two sections of which diameters are different, the configuration of the nozzles N is not limited to this. For example, the nozzles N may have a fixed diameter or have three or more sections of which diameters are different.

E2: Second Modification

A configuration of the head chip 51 is not limited to the example illustrated in FIG. 3 and may be arbitrarily determined.

E3: Third Modification

Although the liquid ejecting apparatus 100 employing a serial method in which the carriage 41 including the liquid ejection head 50 mounted thereon reciprocates is illustrated in the embodiments described above, the present disclosure is applied to a liquid ejecting apparatus employing a line method in which a plurality of nozzles N are distributed across an entire width of a medium M.

E4: Fourth Modification

The liquid ejecting apparatus 100 illustrated in the foregoing embodiments may be employed in various apparatuses including a facsimile device or a photocopier in addition to an apparatus dedicated for printing, and usage of the present disclosure is not particularly limited. The usage of the liquid ejecting apparatus is not limited to printing. For example, a liquid ejecting apparatus ejecting color solution may be used as a fabrication apparatus that fabricates a color filter for a display device, such as a liquid crystal display panel. Furthermore, a liquid ejecting apparatus that ejects solution of a conductive material is used as a fabrication apparatus that forms wiring and electrodes on a wiring substrate. Moreover, a liquid ejecting apparatus that ejects organic solution associated with living bodies is used as a fabrication apparatus that fabricates a biochip, for example.

What is claimed is:

1. A liquid ejecting apparatus, comprising:

a nozzle that ejects liquid;

a pressure chamber that is configured to communicate with the nozzle;

a driving element that is configured to apply a pressure change on liquid included in the pressure chamber in accordance with a driving signal;

a driving signal generation section that is configured to generate the driving signal; and a controller that is configured to control supply of the driving signal to the driving element for each unit period that is a predetermined cycle period; wherein the driving signal includes, at different timing in the unit period:

- a first ejection pulse for driving the driving element so that liquid is ejected from the nozzle;
- a second ejection pulse for driving the driving element so that liquid is ejected from the nozzle; and
- a non-ejection pulse for driving the driving element without ejecting liquid from the nozzle, the controller selects, when a first amount of liquid is to be ejected from the nozzle in the unit period, the first ejection pulse and the second ejection pulse as pulses to be supplied to the driving element, and selects, when a second amount of liquid that is smaller than the first amount of liquid is to be ejected from the nozzle in the unit period, the non-ejection pulse and the second ejection pulse as pulses to be supplied to the driving element, the second amount of liquid is larger than an amount of liquid ejected from the nozzle obtained when only the second ejection pulse is supplied to the driving element, and the first amount is larger than a sum of an amount of liquid ejected from the nozzle when only the first ejection pulse is supplied to the driving element and an amount of liquid ejected from the nozzle when only the second ejection pulse is supplied to the driving element.

2. The liquid ejecting apparatus according to claim 1, wherein an interval between the first ejection pulse and the second ejection pulse in the unit period is within a range from 0.4 times a characteristic vibration period of meniscus of the liquid in the nozzle or more and 0.6 times the characteristic vibration period or less.

3. The liquid ejecting apparatus according to claim 1, wherein a timing of the second ejection pulse comes after a timing of the first ejection pulse in the unit period, and when the first amount of liquid is ejected from the nozzle in each of the two consecutive unit periods, the two consecutive unit periods are a first period and a second period that comes immediately after the first period, an interval between the second ejection pulse in the first period and the first ejection pulse in the second period is within a range from 0.4 times a characteristic vibration period of meniscus of the liquid in the nozzle or more and 0.6 times the characteristic vibration period or less.

4. The liquid ejecting apparatus according to claim 1, wherein a voltage amplitude of the first ejection pulse and a voltage amplitude of the second ejection pulse are equal to each other.

5. The liquid ejecting apparatus according to claim 1, wherein a timing of the non-ejection pulse comes immediately before a timing of the second ejection pulse in the unit period.

6. The liquid ejecting apparatus according to claim 1, wherein a timing of the first ejection pulse comes immediately before a timing of the non-ejection pulse in the unit period.

7. The liquid ejecting apparatus according to claim 1, wherein the first amount is within a range from 1.8 times the second amount or more and 2.2 times the second amount or less.

8. The liquid ejecting apparatus according to claim 1, wherein the controller selects the non-ejection pulse as a pulse to be supplied to the driving element, when the driving element is to be driven without ejecting liquid from the nozzle in the unit period.

9. The liquid ejecting apparatus according to claim 1, wherein the non-ejection pulse, the second ejection pulse, the third ejection pulse, and the first ejection pulse are arranged in this order in the unit period.

10. A liquid ejecting apparatus comprising:

a nozzle that ejects liquid;

a pressure chamber that is configured to communicate with the nozzle;

a driving element that is configured to apply a pressure change on liquid included in the pressure chamber in accordance with a driving signal;

a driving signal generation section that is configured to generate the driving signal; and a controller that is configured to control supply of the driving signal to the driving element for each unit period that is a predetermined cycle period, wherein the driving signal includes, at different timing in the unit period:

a first ejection pulse for driving the driving element so that liquid is ejected from the nozzle;

a second ejection pulse for driving the driving element so that liquid is ejected from the nozzle; and a non-ejection pulse for driving the driving element without ejecting liquid from the nozzle, the controller selects, when a first amount of liquid is to be ejected from the nozzle in the unit period, the first ejection pulse and the second ejection pulse as pulses to be supplied to the driving element, and selects, when a second amount of liquid that is smaller than the first amount of liquid is to be ejected from the nozzle in the unit period, the non-ejection pulse and the second ejection pulse as pulses to be supplied to the driving element, the second amount of liquid is larger than an amount of liquid ejected from the nozzle obtained when only the second ejection pulse is supplied to the driving element, the driving signal includes a third ejection pulse for driving the driving element so that the liquid is ejected from the nozzle in the unit period at a timing different from timings of the first ejection pulse, the second ejection pulse, and the non-ejection pulse in the unit period, and the controller selects the third ejection pulse as a pulse to be supplied to the driving element, when a third amount of liquid that is smaller than the second amount of liquid is to be ejected from the nozzle in the unit period.

11. The liquid ejecting apparatus according to claim 10, wherein the third ejection pulse, the first ejection pulse, the non-ejection pulse, and the second ejection pulse are arranged in this order in the unit period.

12. The liquid ejecting apparatus according to claim 10, wherein the non-ejection pulse, the second ejection pulse, the third ejection pulse, and the first ejection pulse are arranged in this order in the unit period.

13. The liquid ejecting apparatus according to claim 10, wherein the second amount is within a range from 1.8 times the third amount or more and 2.2 times the third amount or less.

14. The liquid ejecting apparatus according to claim 10, wherein a difference between a rate of the second amount to the third amount and a rate of the first amount to the second amount is 10 percent or less.

15. The liquid ejecting apparatus according to claim 10, wherein a timing of the non-ejection pulse comes immediately before a timing of the second ejection pulse in the unit period.

16. The liquid ejecting apparatus according to claim 10, wherein a timing of the first ejection pulse comes immediately before a timing of the non-ejection pulse in the unit period.

* * * * *